(12) United States Patent
Lee et al.

(10) Patent No.: US 11,173,607 B2
(45) Date of Patent: Nov. 16, 2021

(54) ACCIDENT MONITORING SYSTEM USING UWB-BASED REAL-TIME POSITIONING

(71) Applicant: SUN HST Co., Ltd., Ulsan (KR)

(72) Inventors: Jin Yong Lee, Ulsan (KR); Young Kuk Kwon, Busan (KR); Jeong Hun Lee, Ulsan (KR); Young Kwang Kim, Ulsan (KR); Myoung Hoon Choi, Busan (KR); Su Jin Lee, Ulsan (KR)

(*) Notice: Subject to any disclaimer, the term of this patent is extended or adjusted under 35 U.S.C. 154(b) by 179 days.

(21) Appl. No.: 16/683,296

(22) Filed: Nov. 14, 2019

(65) Prior Publication Data

US 2020/0206930 A1    Jul. 2, 2020

(51) Int. Cl.

| G08B 21/02 | (2006.01) |
| B25J 9/16 | (2006.01) |
| G05B 19/05 | (2006.01) |
| G06K 7/10 | (2006.01) |
| G08B 21/22 | (2006.01) |

(52) U.S. Cl.
CPC .......... B25J 9/1676 (2013.01); G05B 19/058 (2013.01); G06K 7/10475 (2013.01); G08B 21/22 (2013.01); *G05B 2219/14006* (2013.01)

(58) Field of Classification Search
CPC ................. B25J 9/1676; G05B 19/058; G05B 2219/14006; G06K 7/10475; G08B 21/22
See application file for complete search history.

(56) References Cited

U.S. PATENT DOCUMENTS

| 5,315,289 | A * | 5/1994 | Fuller | A41D 13/00 340/532 |
| 6,344,794 | B1 * | 2/2002 | Ulrich | G06K 17/0022 340/539.16 |
| 7,298,258 | B1 * | 11/2007 | Hudgens | G08B 21/22 340/539.13 |
| 7,592,911 | B1 * | 9/2009 | Hudgens | F16P 3/147 340/539.13 |
| 10,984,644 | B1 * | 4/2021 | Alsahlawi | G08B 21/14 |
| 2004/0100384 | A1 * | 5/2004 | Chen | G07C 9/28 340/572.1 |
| 2007/0205861 | A1 * | 9/2007 | Nair | F16P 3/144 340/5.61 |
| 2013/0257622 | A1 * | 10/2013 | Davalos | G01J 1/0238 340/635 |
| 2017/0124836 | A1 * | 5/2017 | Chung | H04B 7/14 |
| 2018/0370034 | A1 * | 12/2018 | Lee | B25J 9/1676 |

* cited by examiner

*Primary Examiner* — Munear T Akki
(74) *Attorney, Agent, or Firm* — Antonio Ha & U.S. Patent, LLC

(57) ABSTRACT

An accident monitoring system based on UWB-based real-time positioning comprises a UWB tag, a plurality of UWB anchors installed around a processing line and receiving the worker's position from the UWB tag and sensing predetermined information for the processing line, an AP receiving the worker's position and the predetermined information for from the plurality of UWB anchors, a server receiving the worker's position and the predetermined information for from the AP, storing the worker's position and the predetermined information for, and determining whether the worker is in a preset access-limited area, and a programmable logic control (PLC) box, upon receiving proximity information indicating that the worker is the access-limited area from the server through the AP, controlling to stop the industrial robot, the conveyor belt, and the motor in the processing line.

13 Claims, 16 Drawing Sheets

PROCESSING LINE MAP

ACCIDENT MONITORING SYSTEM USING UWB-BASED REAL-TIME POSITIONING

CROSS-REFERENCE TO RELATED APPLICATION(S)

This application is based on and claims priority under 35 U.S.C. 119 to Korean Patent Application No. 10-2018-0170556, filed on Dec. 27, 2018, in the Korean Intellectual Property Office, the disclosure of which is herein incorporated by reference in its entirety.

TECHNICAL FIELD

Embodiments of the disclosure relate to an accident monitoring system using UWB-based real-time positioning.

DESCRIPTION OF RELATED ART

Process automation is in progress in industrial sites to raise work efficiency. However, in such spaces where automation for the whole process is difficult to achieve, workers are always exposed to risk. Although there is a system for full-process automation, it is inevitable to approach areas (operated by industrial robots) where accidents may occur, for the purposes of alarm setting/resetting and system maintenance. To address such issues, safety sensors may be installed at the entrance of the fence before the robot. The sensors may stop the robot from operating, e.g., by powering off the robot when a worker enters the fence. This way, however, still puts the worker in the fence at risk of accidents as the robot may resume operation erroneously or if other workers unknowingly may do so. Further, workers are unwilling to stop the robots when entering the work sites for minor repair to avoid delay in the entire process and, for this reason, they oftentimes encounter accidents.

Industrial accidents are still frequent due to the presence of a great number of workers and various processing lines in the work site and a lack of such system that may exactly figure out and manage entrances and exits.

The description disclosed in the Background section is only for a better understanding of the background of the invention and may also include information which does not constitute the prior art.

SUMMARY

According to an embodiment of the disclosure, there may be provided an accident monitoring system using UWB-based real-time positioning. According to various embodiments, there may be provided a system that may prevent accidents due to a malfunction in equipment or the worker's random access in the environment furnished with industrial automation equipment. For example, the worker's current position in the work site may be grasped in real-time based on a real-time positioning system and, if the worker approaches an area (access-limited area) pre-stored in a map, the automation equipment in the area associated for the worker's safety may stop the system and provide a notification.

According to an embodiment, an accident monitoring system based on ultra-wide band (UWB)-based real-time positioning comprises a UWB tag worn on a worker, a plurality of UWB anchors installed around a processing line where an industrial robot, a conveyor belt, and a motor are installed, the plurality of UWB anchors receiving the worker's position from the UWB tag and sensing a temperature, humidity, illuminance, and frequency of the processing line, an access point (AP) receiving the worker's position and the temperature, humidity, illuminance, and frequency of the processing line from the plurality of UWB anchors, a server receiving the worker's position and the temperature, humidity, illuminance, and frequency of the processing line from the AP, storing the worker's position and the temperature, humidity, illuminance, and frequency of the processing line, and determining whether the worker is in a preset access-limited area, and a programmable logic control (PLC) box, upon receiving proximity information indicating that the worker is the access-limited area from the server through the AP, controlling to stop the industrial robot, the conveyor belt, and the motor in the processing line.

The plurality of UWB anchors may be attached or fastened in positions where the overall processing line is scannable.

The plurality of UWB anchors may be wirelessly time-synchronized with each other.

The UWB tag may transmit a time stamp to each of the plurality of UWB anchors, wherein each of the plurality of UWB anchors transmits the time stamp through the AP to the server, and the server may determine a position of the UWB tag based on a difference between the time stamps received from the plurality of UWB anchors.

A warning buzzer and a warning lamp may be connected to the PLC box. The warning buzzer and the warning lamp may output a warning signal to the worker when receiving the proximity information from the server through the AP.

Upon receiving the proximity information indicating that the worker is in the access-limited area, the server may transmit a warning signal to the worker's portable mobile device.

The server may transmit the worker's position information and the temperature, humidity, illuminance, and frequency information for the processing line to the worker's portable mobile device.

A locking device may be connected with the PLC box to allow the worker to enter or exit the processing line. When the locking device is released, the locking device may transmit a release signal to the PLC box to set the PLC box to a normal entrance/exit mode.

Upon receiving the proximity information from the server through the AP while in the normal entrance/exit mode, the PLC box may control to stop the industrial robot, the conveyor belt, and the motor in the processing line.

Upon receiving the proximity information for the worker from the server through the AP while the locking device is not released, the PLC box may be set to an abnormal entrance/exit mode.

A warning buzzer and a warning lamp may be connected with the PLC box. The warning buzzer and the warning lamp may be operated when the PLC box is set to the abnormal entrance/exit mode.

The server may extract a recall and precision value from the received temperature, humidity, illuminance, and frequency information for the processing line based on classification among machine learning algorithms to thereby accumulate effective data. The server may compare the effective data with a pre-entered maintenance period for the processing line. If the effective data meets the maintenance period for the processing line, the server may transmit a maintenance period information warning signal for the processing line to a manager's portable mobile device.

The server may compare the received temperature, humidity, illuminance, and frequency information for the processing line with pre-entered normal temperature, humidity, illuminance, and frequency information for the processing line. If the received temperature, humidity, illuminance, and frequency information for the processing line departs from the normal temperature, humidity, illuminance, and frequency, the server may transmit a temperature, humidity, illuminance, and frequency information warning signal to a manager's portable mobile device.

According to various embodiments of the disclosure, there is provided an accident monitoring system using UWB-based real-time positioning. According to various embodiments, there may be provided a system that may prevent accidents due to a malfunction in equipment or the worker's random access in the environment furnished with industrial automation equipment. For example, the worker's current position in the work site may be grasped in real-time based on a real-time positioning system and, if the worker approaches an area (access-limited area) pre-stored in a map, the automation equipment in the area associated for the worker's safety may stop the system and provide a notification.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
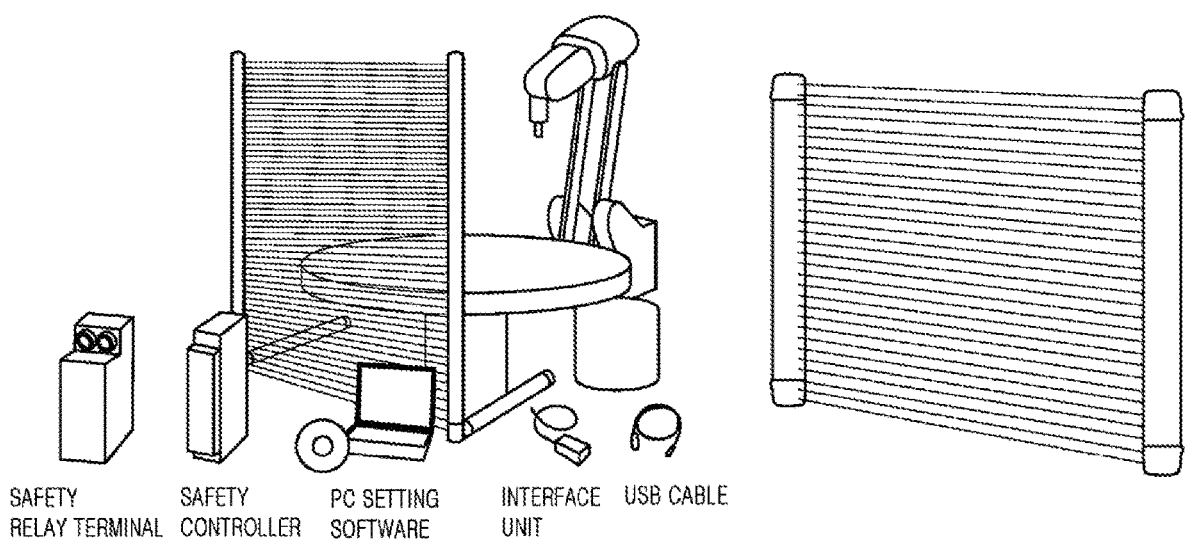
FIG. 1 is a view illustrating an example in which a photoelectric sensor is used.

Hereinafter, embodiments of the disclosure are described in detail with reference to the accompanying drawings.

Embodiments of the disclosure are provided to thoroughly explain the disclosure to those skilled in the art, and various modifications may be made thereto, and the scope of the disclosure is not limited thereto. Embodiments of the disclosure are provided to fully and thoroughly convey the spirit of the disclosure to those skilled in the art.

As used herein, the thickness and size of each layer may be exaggerated for ease or clarity of description. The same reference denotations may be used to refer to the same or substantially the same elements throughout the specification and the drawings. As used herein, the term "A and/or B" encompasses any, or one or more combinations, of A and B. It will be understood that when an element or layer is referred to as being "on," "connected to," "coupled to," or "adjacent to" another element or layer, it can be directly on, connected, coupled, or adjacent to the other element or layer, or intervening elements or layers may be present.

The terms as used herein are provided merely to describe some embodiments thereof, but not intended as limiting the disclosure. As used herein, the singular forms "a," "an," and "the" are intended to include the plural forms as well, unless the context clearly indicates otherwise. As used herein, the term "comprise," "include," and/or "comprising" or "including" does not exclude the presence or addition of one or more other components, steps, operations, and/or elements than the component, step, operation, and/or element already mentioned.

As used herein, the terms "first" and "second" may be used to describe various members, parts, regions, areas, layers, and/or portions, but the members, parts, regions, areas, layers, and/or portions are not limited thereby. These terms are used merely to distinguish one member, part, region, area, layer, or portion from another. Accordingly, the term "first member," "first part," "first region," "first area," "first layer," or "first portion" described herein may denote a "second member," "second part," "second region," "second area," "second layer," or "second portion" without departing from the teachings disclosed herein.

The terms "beneath," "below," "lower," "under," "above," "upper," "on," or other terms to indicate a position or location may be used for a better understanding of the relation between an element or feature and another as shown in the drawings. However, embodiments of the disclosure are not limited thereby or thereto. For example, where a lower element or an element positioned under another element is overturned, then the element may be termed as an upper element or element positioned above the other element. Thus, the term "under" or "beneath" may encompass, in meaning, the term "above" or "over."

As described herein, the programmable logic control (PLC) box, server, and/or other related devices or components or parts may be implemented in hardware, firmware, application specific integrated circuits (ASICs), software, or a combination thereof. For example, the PLC box, server, and/or other related devices or components or parts may be implemented in a single integrated circuit (IC) chip or individually in multiple IC chips. Further, various components of the PLC box or server may be implemented on a flexible printed circuit board, in a tape carrier package, on a printed circuit board, or on the same substrate as the controller. Further, various components of the PLC box or server may be processes, threads, operations, instructions, or commands executed on one or more processors in one or more computing devices, which may execute computer programming instructions or commands to perform various functions described herein and interwork with other components. The computer programming instructions or commands may be stored in a memory to be executable on a computing device using a standard memory device, e.g., a random access memory (RAM). The computer programming instructions or commands may be stored in, e.g., a compact-disc read only memory (CD-ROM), flash drive, or other non-transitory computer readable media. It will be appreciated by one of ordinary skill in the art that various functions of the computing device may be combined together or into a single computing device or particular functions of a computing device may be distributed to one or other computing devices without departing from the scope of the disclosure.

As an example, the PLC box or server of the disclosure may be operated on a typical commercial computer including a central processing unit, a hard disk drive (HDD) or solid state drive (SSD) or other high-volume storage, a volatile memory device, a keyboard, mouse, or other input devices, and a monitor, printer, or other output devices.

FIG. 1 schematically illustrates an example in which photoelectric sensors (e.g., safety light curtains or industrial gate sensors) are used.

The photoelectric sensor perform its sensing operation based on light without the need for a direct contact to the object and may thus be semi-permanently used without damage to itself or the object. The photoelectric sensor may detect an object which is up to 10 m away in the case of a transmissive type, 3 m away in the case of mirror reflection type, and 150 cm away in the case of object reflection type. As operated based on light, the photoelectric sensor exhibits a short response time and discriminate objects based on the color. However, the photoelectric sensor may be influenced a lot by the sunlight or dust and, if used in a wide area, may present poor sensing results—for example, if two people pass a wide gate where the photoelectric sensor is installed, the sensor may count only one.

Figure 2:
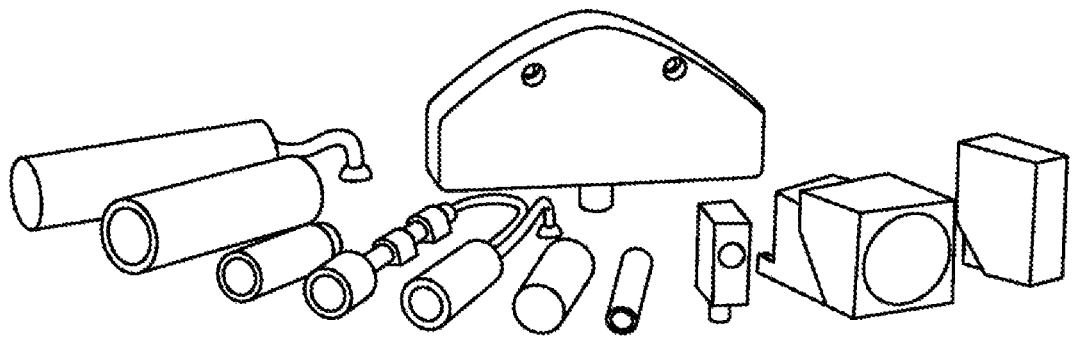
FIG. 2 is a view illustrating an example in which an ultrasonic sensor is used.

FIG. 2 is a view illustrating an example in which an ultrasonic sensor is used.

When applied alternating current (AC) voltage with the same frequency as the natural frequency, the ultrasonic sensor may generate a more effective sound wave. The sound wave reflected by the object is input to the sensor, and a vibration occurs in the sensor to create a voltage. The voltage is processed by the circuitry to measure the distance. If the transmit part of the ultrasonic sensor radiates pulses for a short time, the pulse signal reaches and is then reflected by the object to the sensor. The receive part of the ultrasonic sensor may detect the reflected signal.

Figure 3:
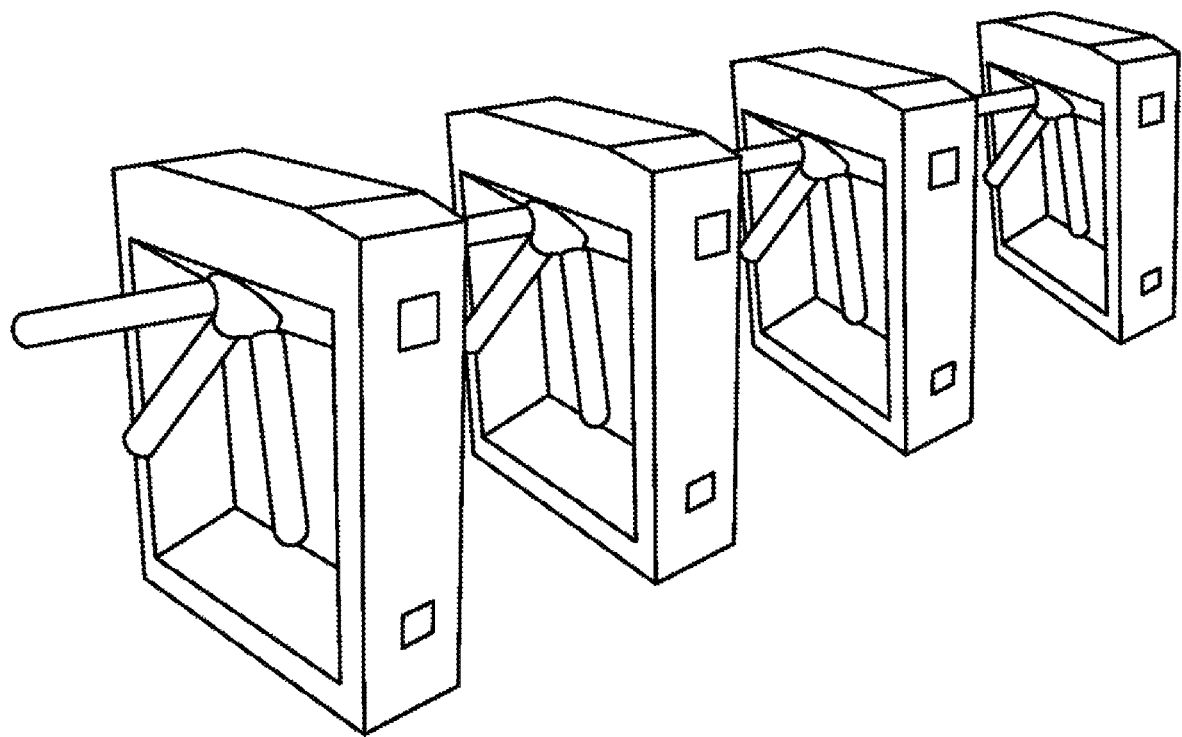
FIG. 3 is a view illustrating an example in which a gate sensor is used.

FIG. 3 is a view schematically illustrating an example of a gate sensor (e.g., a hall sensor or engineering switch) is used.

The gate sensor may be installed at a gate and precisely control and count entrances and exits via a shutter and bar installed at the gate. However, the shutter and bar may cause inconvenience and may be broken.

Figure 4:
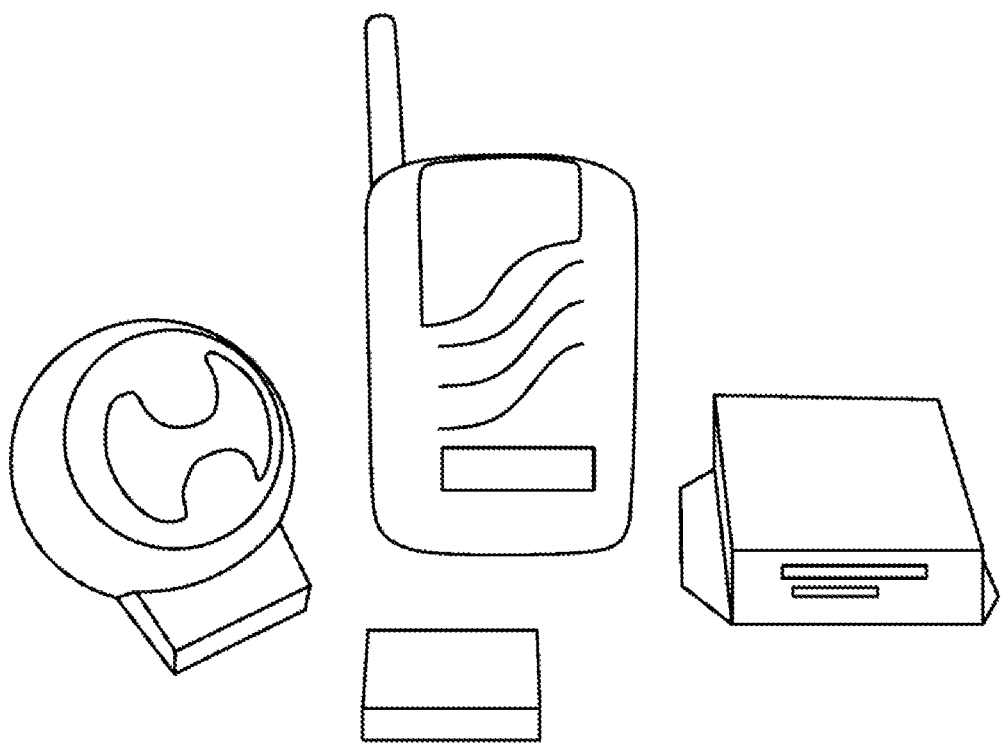
FIG. 4 is a view illustrating an example in which a human heat sensor is used.

FIG. 4 is a view illustrating an example in which a human heat sensor is used.

The human heat sensor may be a passive infrared (PIR) sensor. PIR sensors may detect or count changes in heat from the human body which occur whenever he or she moves and are widely used in surveillance cameras or CCTV. For simplicity in installation, PIR sensors are used in various places. However, this kind of sensors react only when the human moves and may repeatedly detect a single person only once or multiple times and, as such, the accuracy may be low.

Figure 5:
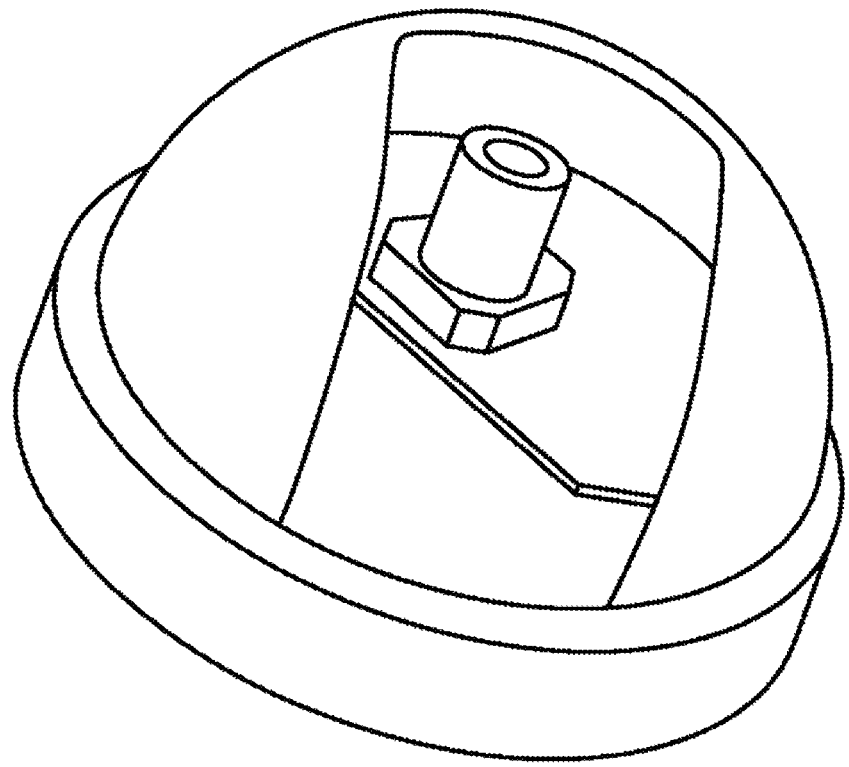
FIG. 5 is a view illustrating an example in which an image analysis sensor is used.

FIG. 5 is a view illustrating an example in which an image analysis sensor is used.

The image analysis sensor may be a camera that may count people in such a manner that an image of an object which is presumed to be a human passes a virtual line on the captured image based on an image pattern. The image analysis sensor may check people's entrances and exits while storing images for them. However, the image analysis sensor may oftentimes give different results which may be less accurate particularly when simultaneous entrances or exits occur. Further, the image analysis sensor requires an information processing-dedicated main computer, rendering the system complicated.

Figure 6:
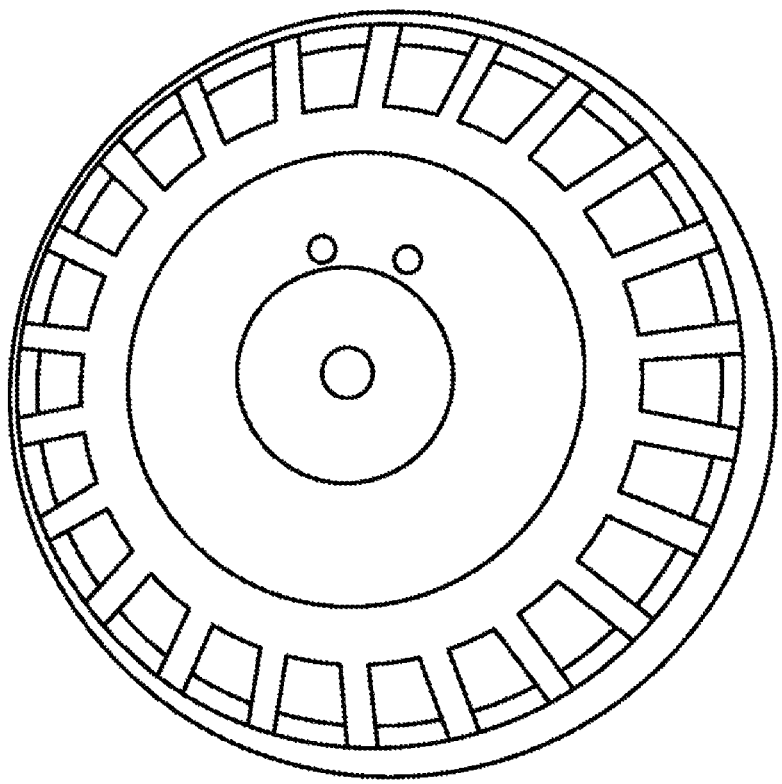
FIG. 6 is a view illustrating an example in which an human heat image analysis sensor is used.

FIG. 6 is a view illustrating an example in which a human heat image analysis sensor is used.

The human heat image analysis sensor may be a thermal imaging camera that may analyze a human's thermal image to identify the human. The human heat image analysis sensor, unlike other kinds of sensors, may advantageously differentiate between objects but may have limits in width and distance for detection and its accuracy may also be limited by algorithm. Further, this kind of sensors are expensive, raising the cost of the system.

Figure 7:
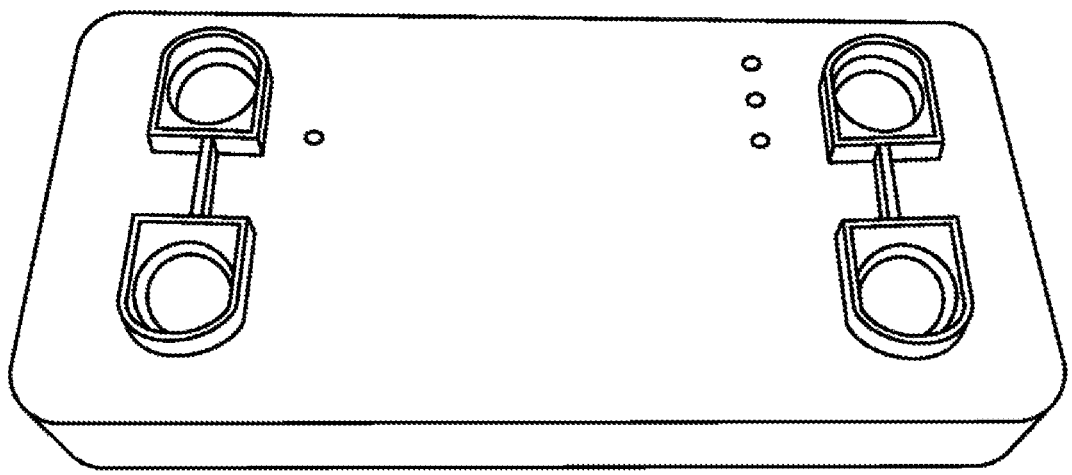
FIG. 7 is a view illustrating an example in which a height variation analysis sensor is used.

FIG. 7 is a view illustrating an example in which a height variation analysis sensor is used.

Multiple height variation analysis sensors may measure changes in height form the ground on a real-time basis and may adopt infrared (IR) sensors or laser sensors. Despite its merits, such as no limit in distance, individual operation, and installation on ceiling so free from bothering entrances or exits, some limitations are posed such as requiring multiple units and difficulty in figuring out entrances and exits.

Figure 8:
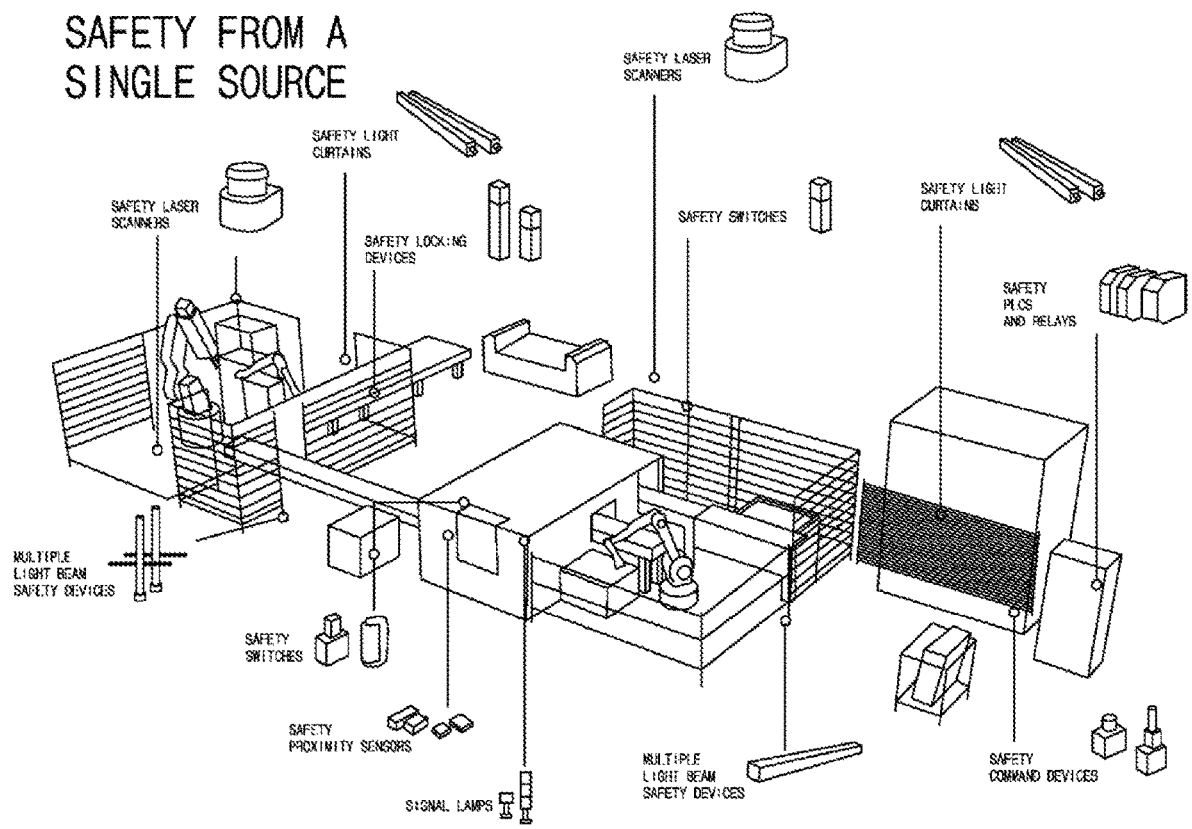
FIG. 8 is a view illustrating an example in which safety equipment are used.

FIG. 8 is a view illustrating an example in which safety equipment are used.

Referring to FIG. 8, a safety equipment-related safety system typically includes safety switches, light curtains, safety laser scanners, and safety mats. The above-mentioned safety sensors and devices have limited scanning ranges and, if installed at the entrance of each section, they may restrict the operation of the system based on entrances and exits. However, as mentioned above, if an entrance/exit is made without following a normal safety procedure or the system operation is resumed by other worker, the convent system may not stop the operation.

Figure 9A:
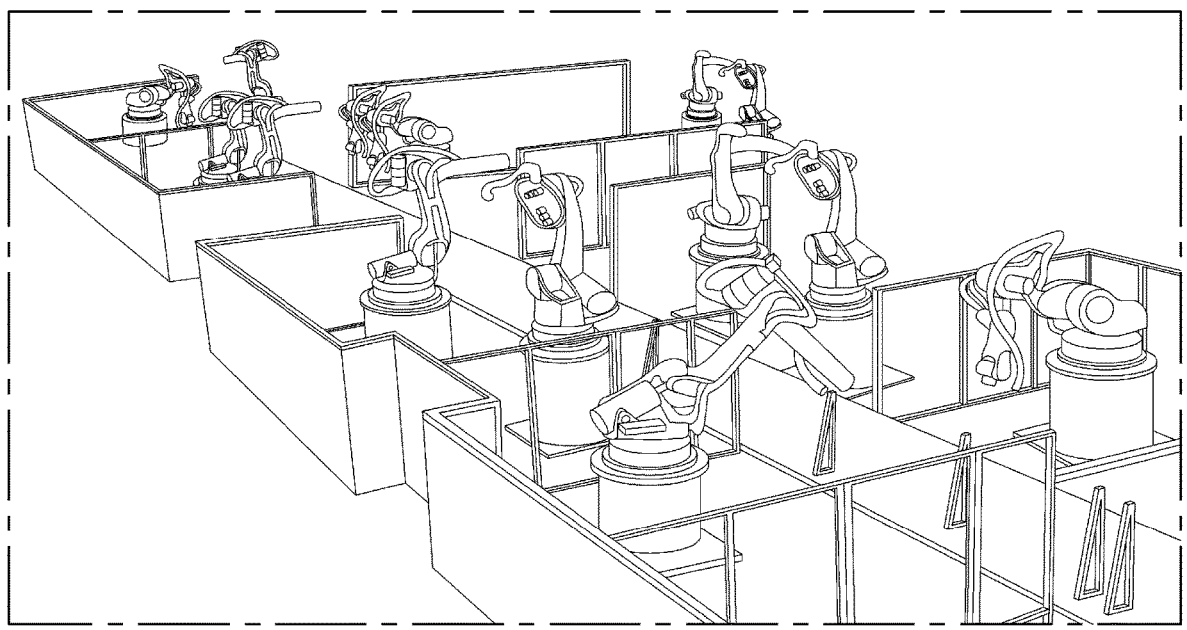
FIGS. 9A and 9B are views illustrating an example in which a photoelectric sensor is used.
Figure 9B:
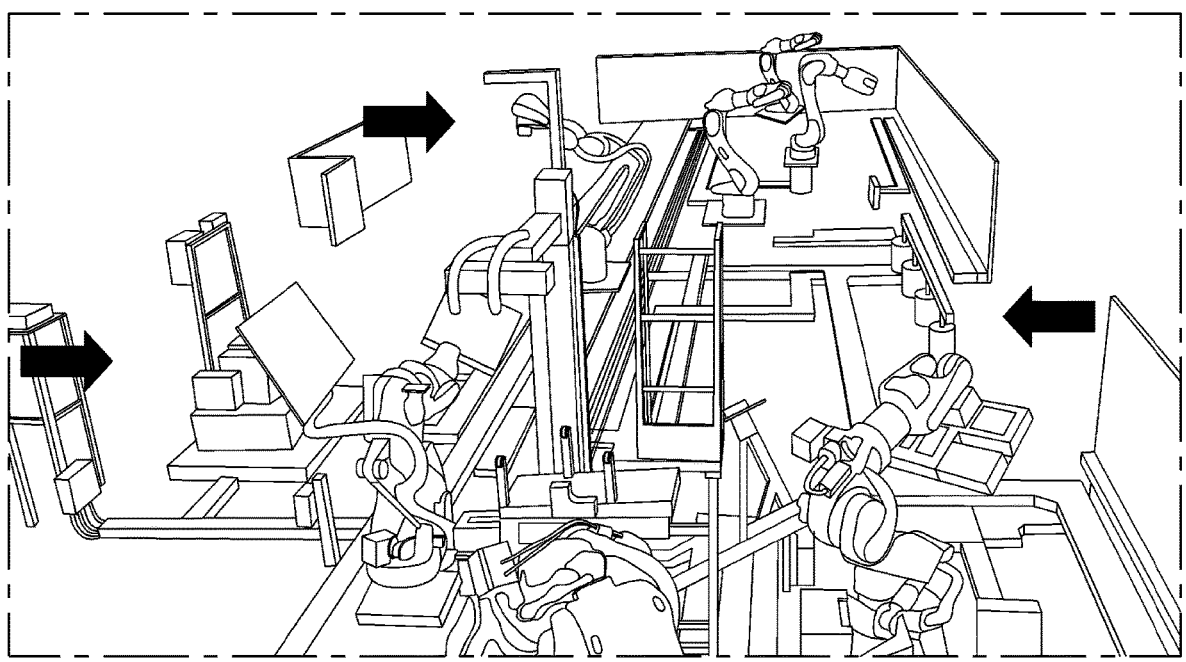

FIGS. 9A and 9B are views illustrating an example in which a photoelectric sensor is used.

As shown in FIGS. 9A and 9B, fences are installed for safety purposes but, for product loading or equipment installation, some area may lack fences or sensors. Accidents mostly occur when workers access the site through a route other than the fence gate or door without observing the safety procedure. In FIG. 9B, the left-hand arrows indicate product access-limited areas where products equipped with safety mats and light curtains may be loaded, and the right-hand arrow indicates a structure of installing other equipment. The gates (including locking devices) that workers may enter or exit are separately provided.

Figure 10:
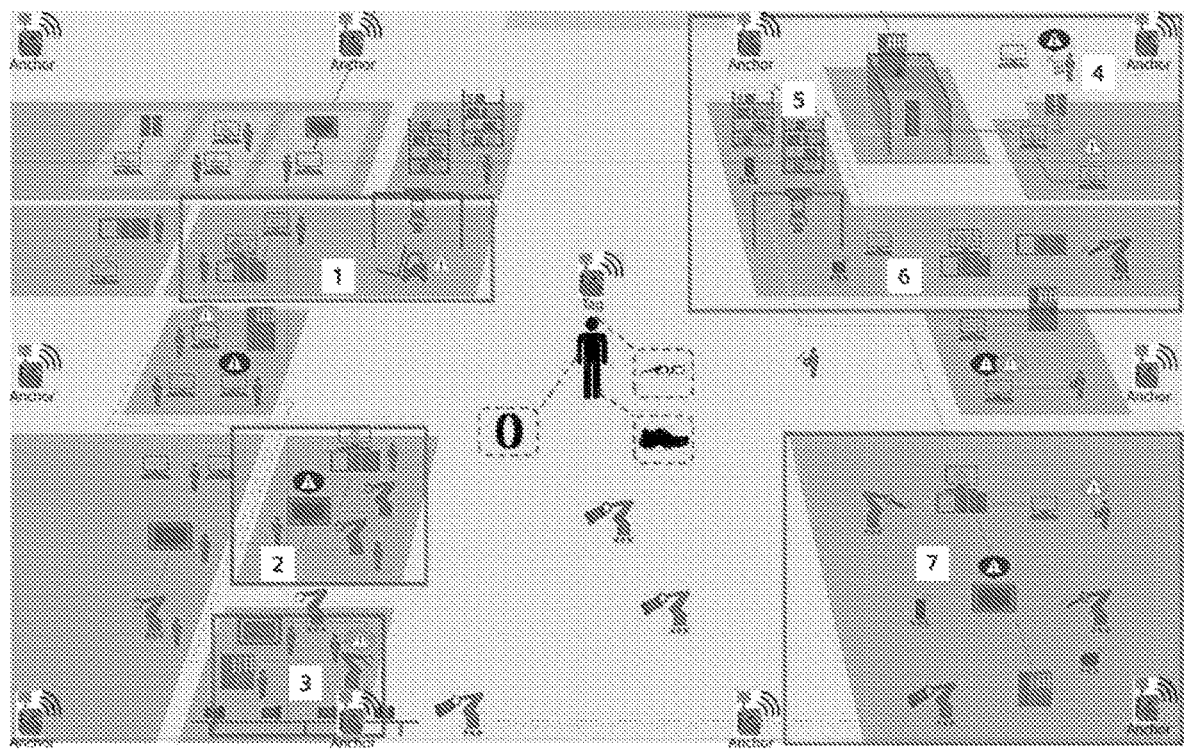
FIG. 10 is a view illustrating an example of use of an accident monitoring system using UWB-based, real-time positioning according to an embodiment.

FIG. 10 is a view illustrating an example of use of an accident monitoring system using UWB-based, real-time positioning according to an embodiment.

Referring to FIG. 10, in an accident monitoring system according to an embodiment, the processing line distances are previously calculated in the area where robots are operated, e.g., the area where the robots are required to stop for a worker to access, thereby designating access-limited areas 1, 2, 3, 4, 5, 6, and 7. A plurality of ultra-wide band (UWB) anchors are installed around the processing lines. If a worker with a UWB tag enters an access-limited area, the UWB anchors may sense the worker and transmit the sensed result (or data or information) to a server and/or programmable logic control (PLC) box. The PLC box may control the robots and emits a buzz or alarm.

Figure 11:
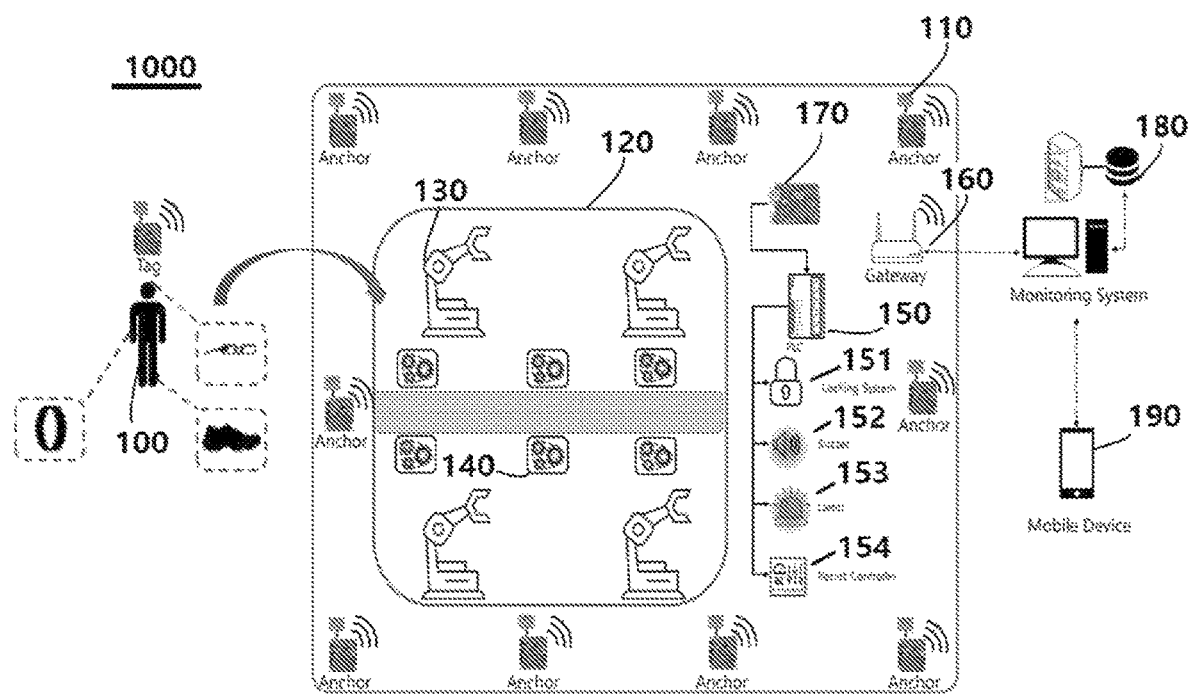
FIG. 11 is a view illustrating a configuration of an accident monitoring system using UWB-based, real-time positioning according to an embodiment.

FIG. 11 is a view illustrating a configuration of an accident monitoring system 1000 using UWB-based, real-time positioning according to an embodiment.

Referring to FIG. 11, according to an embodiment, the accident monitoring system 1000 using UWB-based, real-time positioning may include a UWB tag 100, a plurality of UWB anchors 110, a processing line 120, an access point (AP) 160, a PLC box 150, and a server 180. A personal computer (PC) program controller 170 may be connected to the PLC box 150 and a locking device 151, a warning buzzer 152, a warning lamp 153, and a robot controller 154 may further be connected to the PLC box 150. The server 180 may be communicably connected with the worker's and/or manager's portable mobile device 190.

The UWB tag 100 may be worn on the worker in various forms, such as, but not limited to, in/on glasses, shoe, or bracelet, and wirelessly transmit the identification (ID) and time stamps of the UWB tag 100 in nano-seconds or millimeter seconds to the plurality of UWB anchors 110.

The standardization for commercial use of UWB-based positioning has been completed in IEEE 802.15.3a and IEEE 802.15.4a. The impulse-radio ultra-wide band (IRUWB) enables high-rate data transmission of 100 Mbps or more in 3.1 to 10.6 GHz bands according to transmission standards and allows for positioning and tracking within a few tens of cm to a few tens of meters indoors or outdoors in low power as compared with the conventional Wi-Fi and Bluetooth standards. The UWB tag 100 and the plurality of UWB anchors 110 may address the issues with the above-described sensors commonly used and enable precise scanning of objects.

Such UWB-based wireless positioning scheme is performed in a time difference of arrival (TDoA) scheme that time-synchronizes the plurality of UWB anchors 110 and simultaneously measure signal arrival times between the UWB tag 100 and the plurality of UWB anchors 110 to thereby calculate the distance or in a two-way ranging (TWR) scheme that calculates the round trip times (RTTs) between the UWB tag 100 and the plurality of UWB anchors 110 and converts the calculated RTTs into distances. Thus, signal exchange times between the UWB tag 100 and the plurality of UWB anchors 110 are material. Thus, the UWB tag 100 transmits time stamps as well as the ID to the plurality of UWB anchors 110 to allow the server 180 to calculate and determine the real-time position of the worker wearing the UWB tag 100.

The plurality of UWB anchors 110 may be installed around the processing line 120 where the industrial robot 130, the conveyor belt, and/or motor 140 are installed and may receive the worker's position (ID and time stamp) from the UWB tag 100. The plurality of UWB anchors 110 may be attached in a stationary manner in the positions where the overall processing line 120 is scannable. As an example, the plurality of UWB anchors 110 may be attached not onto the wall or ceiling but onto independent supports with no separate reflection surface so as to prevent time delays due to radio wave reflection and to simultaneously scan the processing line 120 and its surroundings. In particular, if the processing line 120 causes lots of vibrations, the supports and UWB anchors 110 may be installed in vibration-free positions not to cause vibrations after installed. By so doing, the plurality of UWB anchors 110 are prevented from multi-path and/or line-of-sight (LoS) issues due to obstacles in the processing line 120.

As described above, the plurality of UWB anchors 110 may be wirelessly time-synchronized with each other. Thus, the accuracy of positioning may be further enhanced by the TDoA scheme. As an example, by the wireless nature, one of the plurality of UWB anchors 110 may be designated as a UWB anchor master, and the other UWB anchors 110 may be all time-synchronized with each other, ensuring the LoS for all of the UWB anchors 110 around the processing line 120. If an obstacle is present in or around the processing line 120, the UWB anchors 110 may be arranged more densely, thereby preventing errors in positioning and position determining.

Further, the plurality of UWB anchors 110 may sense the temperature, humidity, illuminance, and/or frequency of the processing line 120 and transmit the sensed temperature, humidity, illuminance, and/or frequency to the server 180 via the AP 160. To that end, in addition to the structure for receiving the ID and time stamp from the UWB tag 100 and transmitting the ID and time stamp, the UWB anchor 110 may include a temperature sensor, a humidity sensor, an illuminance sensor, and/or a frequency sensor.

As the plurality of UWB anchors 110 are densely arranged in the overall site of the processing line 120, the temperature, humidity, illuminance, and/or frequency may be monitored over the overall processing line 120 and its surroundings.

The processing line 120 (e.g., a fence) may include a plurality of industrial robots 130 (e.g., welding or assembling robots), a conveyor belt, and/or the motor 140 installed thereinside. A predetermined range from the processing line 120 is designated as an worker access-limited area and, if a worker accesses the access-limited area, the industrial robot 130, conveyor belt, and/or motor 140 stop operation, protecting the worker.

The AP 160 (e.g., a router or gateway) may receive the ID of the UWB tag 100 worn on the worker, time stamp, and temperature, humidity, illuminance, and/or frequency of the processing line 120 from the plurality of UWB anchors 110 and wirelessly transmit them to the server 180, the PLC box 150, and/or the portable mobile device 190.

The AP 160 may communicate with the server 180, PLC box 150, and/or portable mobile device 190, but not limited thereto, wiredly, wirelessly, or in a Wi-Fi scheme.

The server 180 receives the temperature, humidity, illuminance, and/or frequency of the processing line 120 and the worker's position (e.g., the position of the UWB tag) from the AP 160, stores the temperature, humidity, illuminance, and/or frequency, and calculates and determines whether the worker is in the preset access-limited area. As an example, the server 180 calculates and determines the worker's position, i.e., the position of the UWB tag 100 based on differences between the time stamps for the plurality of UWB anchors 110. The server 180 may also receive the IDs of multiple UWB tags 100 and calculate and determine per-worker positions.

Upon receiving proximity information indicating that the worker is in the access-limited area via the AP 160 from the server 180, the PLC box 150 controls to stop the industrial robot 130, conveyor belt, and/or motor 140 in the processing line 120.

The industrial robot 130, conveyor belt, and/or motor 140 in the processing line 120 may be communicably connected with the PLC box 150, and a locking device 151, a warning buzzer 152, and a warning lamp 153 for entering or exiting the processing line 120 may also be connected with the PLC box 150 and be electrically controlled by the PLC box 150. For example, upon receiving the proximity information indicating that the worker is in the access-limited area from the server 180 via the AP 160, the PLC box 150 warns the worker via the warning buzzer 152 and/or the warning lamp 153.

The PC program controller 170 (e.g., Arduino) may be electrically connected with the PLC box 150 to modify the PLC program, and the robot controller 154 controls the operation of the industrial robot 130, conveyor belt, and/or motor 140 in the processing line 120.

Upon receiving the proximity information indicating that the worker is in the access-limited area, the server 180 transmits a warning signal (e.g., a vibration or sound) to the worker's portable mobile device 190 and also transmits the worker's position information and temperature, humidity, illuminance, and/or frequency information for the processing line 120 to the worker's portable mobile device 190.

If the locking device 151 is released to enter or exit the processing line 120, the locking device 151 transmits a release signal to the PLC box 150 to thereby set the PLC box 150 to a normal entrance/exit mode. As such, upon receiving the worker's proximity information via the AP 160 from the server 180, with the PLC box 150 set to the normal entrance/exit mode, the PLC box 150 controls to stop the operation of the industrial robot 130, conveyor belt, and/or motor 140 in the processing line 120.

Upon receiving the worker's proximity information from the server 180 via the AP 160, with the locking device 151 not released, the PLC box 150 is set to an abnormal entrance/exit mode. As such, if the PLC box 150 is set to the abnormal entrance/exit mode, the PLC box 150 operates the warning buzzer 152 and/or the warning lamp 153.

The server 180 extracts the recall and precision value from the received temperature, humidity, illuminance, and/or frequency of the processing line 120 based on classification among machine learning algorithms, thereby accumulating effective data. The server 180 compares the effective data with a pre-entered maintenance period for the processing line 120 and, if the effective data is, or meets, the maintenance period for the processing line 120, transmits a maintenance period information warning signal for the processing line 120 to the manager's portable mobile device 190.

The frequency information is frequency information for the UWB anchor 110. If the warning signal is transmitted indicating a relatively short maintenance period for the frequency information, the UWB anchor 110 is preferably relocated and installed in a vibration-free place. If the UWB anchor 110 is installed in a high-frequency position, the installation angle of the UWB anchor 110 may be varied, and the multi-path and/or LoS issue may occur due to the obstacle in the processing line 120.

The server 180 may compare the received temperature, humidity, illuminance, and/or frequency information for the processing line 120 with pre-entered normal temperature, humidity, illuminance, and frequency information for the processing line 120. If the received temperature, humidity, illuminance, and frequency information for the processing line 102 departs from the normal temperature, humidity, illuminance, and frequency, the server may transmit a temperature, humidity, illuminance, and frequency information warning signal to a manager's portable mobile device 190.

Thus, according to an embodiment, the accident monitoring system 1000 using UWB-based, real-time positioning may prevent accidents due to a malfunction in equipment and the worker's random access in the environment with industrial automation equipment. As an example, according to an embodiment, the accident monitoring system 1000 using UWB-based, real-time positioning may grasp, in real-time, the worker's current position in the site and, if the worker accesses a pre-stored area (e.g., access-limited area) in a map, a piece of automation equipment associated therewith for workers' safety may stop the system 1000 and provide a notification function.

Figure 12:
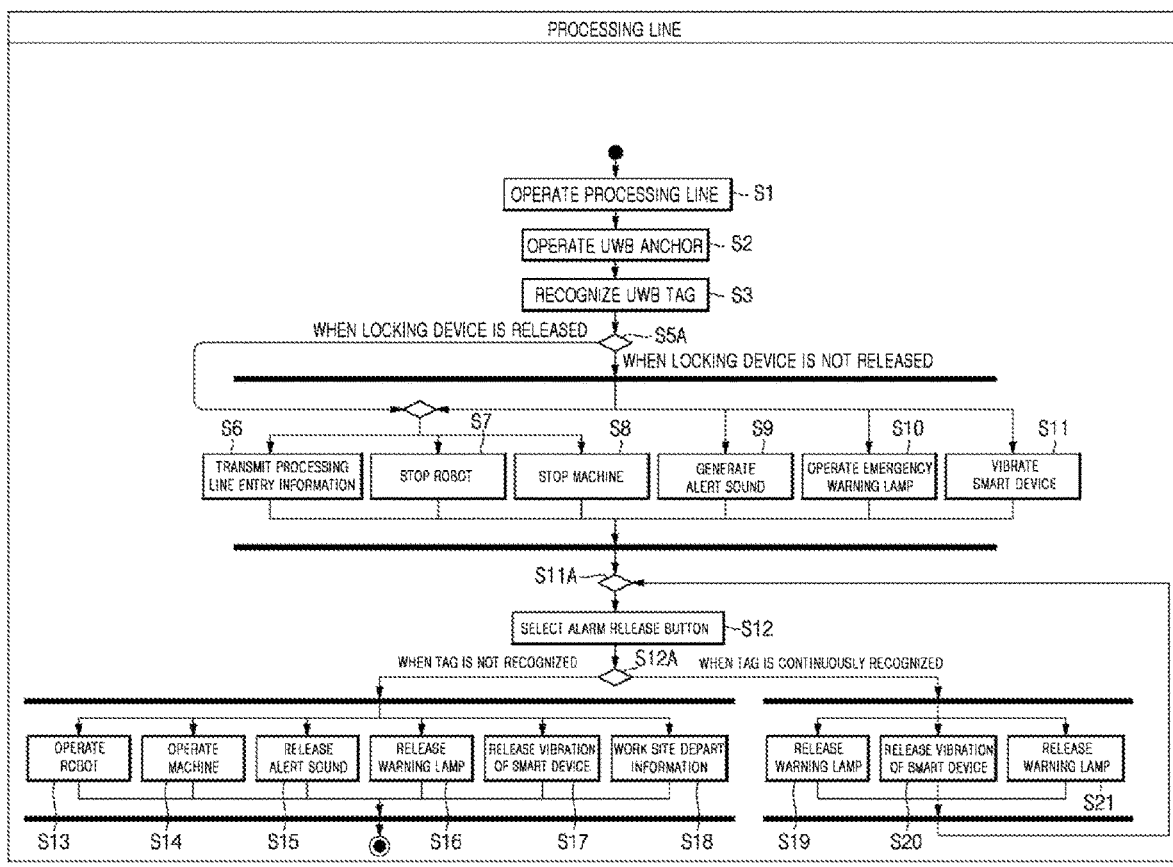
FIG. 12 is a flowchart illustrating operations of an accident monitoring system using UWB-based, real-time positioning in a processing line according to an embodiment.

FIG. 12 is a view illustrating operations of an accident monitoring system 1000 using UWB-based, real-time positioning in a processing line 120 according to an embodiment. The operations are described below with reference to FIGS. 10, 11, and 12.

As power is applied to the industrial robot 130, conveyor belt, and/or motor 140 in the processing line 120 under the control of the PLC box 150, the processing line 120 is operated (S1). The UWB anchors 110 start operate (S2), and whether the UWB tag 100 is recognized is determined (S3).

If the wearable UWB tag 100 is recognized by the UWB anchor 110 in the processing line 120, different operations are performed when the locking device 151 installed at the gate of the processing line 120 is released and when the locking device 151 is not released.

For example, if the locking device 151 is released, the PLC box 150 is set to the "normal entrance/exit mode." As the worker's wearable UWB tag 100 is recognized by the UWB anchor 110, information indicating that the worker enters the processing line 120 is transmitted via the AP 160 to the PLC box 150 and the server 180 (S6). Information (e.g., the ID and time of entrance/exit) for the wearable UWB tag 100 sensed by the UWB anchor 110 is transmitted via the AP 160 to the PLC box 150 and the server 180.

Thus, the PLC box 150 controls the robot controller 154 to stop the industrial robot 130, conveyor belt, and/or motor 140 (S7). Thus, all the machines stop operation (S8), ensuring the worker's safety.

As another example, if the locking device 151 is not released, the PLC box 150 is set to the "abnormal entrance/exit mode." While performing the steps S6, S7, and S8, the PLC box 150 may additionally and immediately provide a visible or audible notification to the worker via the warning buzzer 152 and the warning lamp 153 (S9 and S10). Thus, the worker may immediately recognize his access to the processing line 120 without releasing the locking device 151.

If the portable mobile device 190 (e.g., a smartphone) is previously registered in the AP 160, PLC box 150, or server 180, the server 180 transmits a message through the AP 160 to the portable mobile device 190 so that the portable mobile device 190 is vibrated (S11).

After an alarm release button installed outside the processing line 120 is selected, different operations are subsequently performed depending on whether the wearable UWB tag 100 is recognized (S12 and S12A).

As an example, if after the alarm release button is selected, the wearable UWB tag 100 is not recognized in the processing line 120, the industrial robot 130, conveyor belt, and/or motor 140 are operated under the control of the PLC box 150 (S13), the machine is operated (S14), the warning buzzer 152 is released (S15), the warning lamp 153 is released (S16), and the vibration of the portable mobile device 190 is released (S17). Further, the UWB anchor 110 transmits information indicating that the worker has departed from the processing line 120 via the AP 160 to the PLC box 150 and the server 180 (S18).

As another example, if after the alarm release button is selected, the wearable UWB tag 100 keeps on being recognized in the processing line 120, the PLC box 150 performs the steps S6, S7, and S8 while releasing the warning buzzer 152 (S19), releasing the vibration of the portable mobile device 190 (S20), and releasing the warning lamp 153 (S21). The PLC box 150 returns to step S11A to redetermine whether the alarm release button is released.

Thus, according to an embodiment, the accident monitoring system 1000 using UWB-based, real-time positioning may prevent accidents due to the robot 130 by the UWB tag 100 and UWB anchors 110 in the automated processing line 120 which includes the industrial robot 130 and controls the operation of the robot 130 for the worker's safety when the worker approaches the surroundings (e.g., the access-limited area) of the processing line 120. According to an embodiment, the accident monitoring system 1000 using UWB-based, real-time positioning may protect the worker from accidents that may arise due to the industrial robot 130 and allows the worker to enter the processing line 120 after releasing the locking device 151, thereby preventing deterioration of productivity due to accidents. According to an embodiment, the accident monitoring system 1000 using UWB-based, real-time positioning enables a record for entering or exiting the work site to be automatically generated in the server 180, allowing the worker to do his job with more responsibility.

Figure 13:
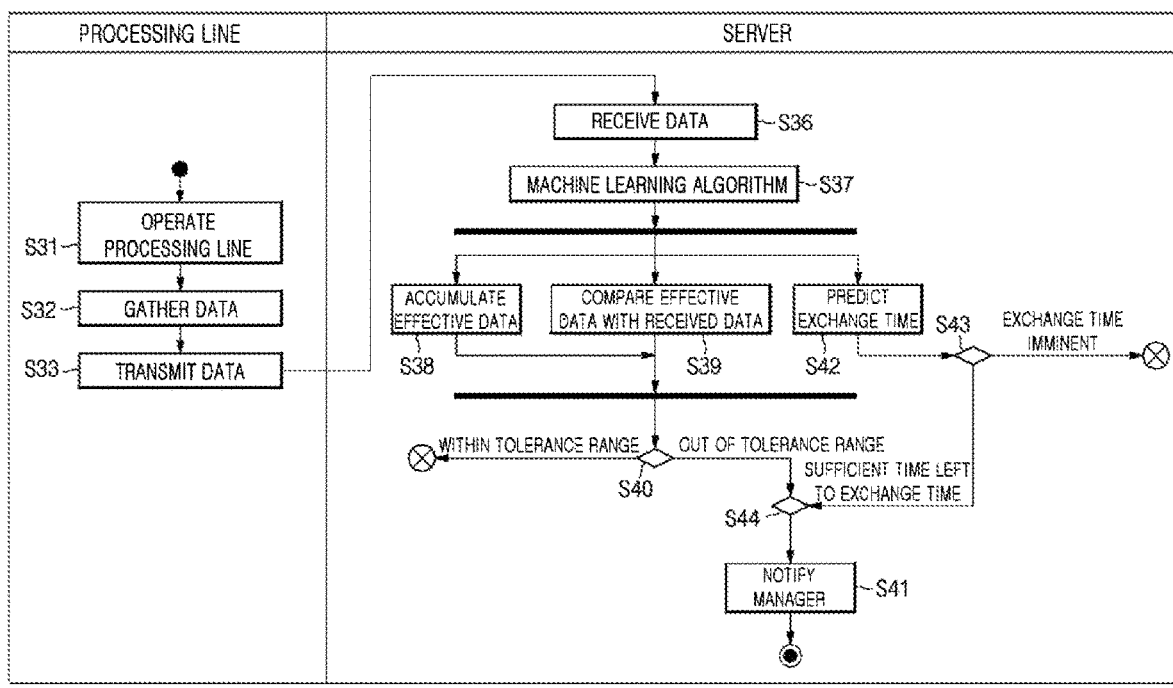
FIG. 13 is a flowchart illustrating operations of a processing line and a server in an accident monitoring system using UWB-based, real-time positioning according to an embodiment.

FIG. 13 is a flowchart illustrating operations of a processing line 120 and a server 180 in an accident monitoring system 1000 using UWB-based, real-time positioning according to an embodiment. The operations are described below with reference to FIGS. 11, 12, and 13.

The industrial robot 130, conveyor belt, and/or motor 140 in the processing line 120 are operated (S31), then the temperature, humidity, illuminance, and/or frequency data are gathered from the UWB anchors 110 (S32), and the gathered data is transmitted via the AP 160 to the server 180 (S33).

The server 180 receives the temperature, humidity, illuminance, and/or frequency data via the AP 160 from the processing line 120 (S36). The server 180 extracts the recall and precision value from the received temperature, humidity, illuminance, and/or frequency data based on, e.g., machine learning (ML) classification among machine learning algorithms (S37).

The server 180 extracts the recall and precision value and accumulates effective data (S38) and compares the effective data with the received temperature, humidity, illuminance, and/or frequency data (S39).

The server 180 compares the effective data with the received temperature, humidity, illuminance, and/or frequency data (S40) and, if the data is within a tolerance range, returns to step S36 and if departing from the tolerance range, notifies the worker/manager of this situation (S41). For example, the server 180 transmits a notification message to the pre-registered portable mobile device 190 and/or a client computer (not shown).

The server 180 compares the accumulated effective data with a pre-entered maintenance period to thereby predict exchange times for various devices (e.g., a temperature controller, humidity controller, illuminance controller, and the support of the UWB anchor 110) (S42). The server 180 determines whether the exchange time is imminent or a sufficient time is left to the exchange time (S43). If a sufficient time is left to the exchange time, the server 180 returns to step S36 and, if the exchange time is imminent (S44), notifies the worker/manager of the same (S41).

Thus, according to an embodiment, the accident monitoring system 1000 using UWB-based, real-time positioning may more efficiently and conveniently manage various devices (e.g., the temperature device, humidity device, illuminance device, and/or the support of the UWB anchor 110) via the UWB anchors 110 in the automated processing line 120 equipped with the industrial robot 130, conveyor belt, and/or motor 140 and may provide notifications for errors and maintenance period for the devices. According to an embodiment, the accident monitoring system 1000 using UWB-based, real-time positioning enables prediction of the exchange times for various devices. Thus, a specific timeline for maintenance of the processing line 120 may be set and maintenance may be specifically planned for factories to which the processing line operation rate is material, leading to huge cost savings.

Figure 14:
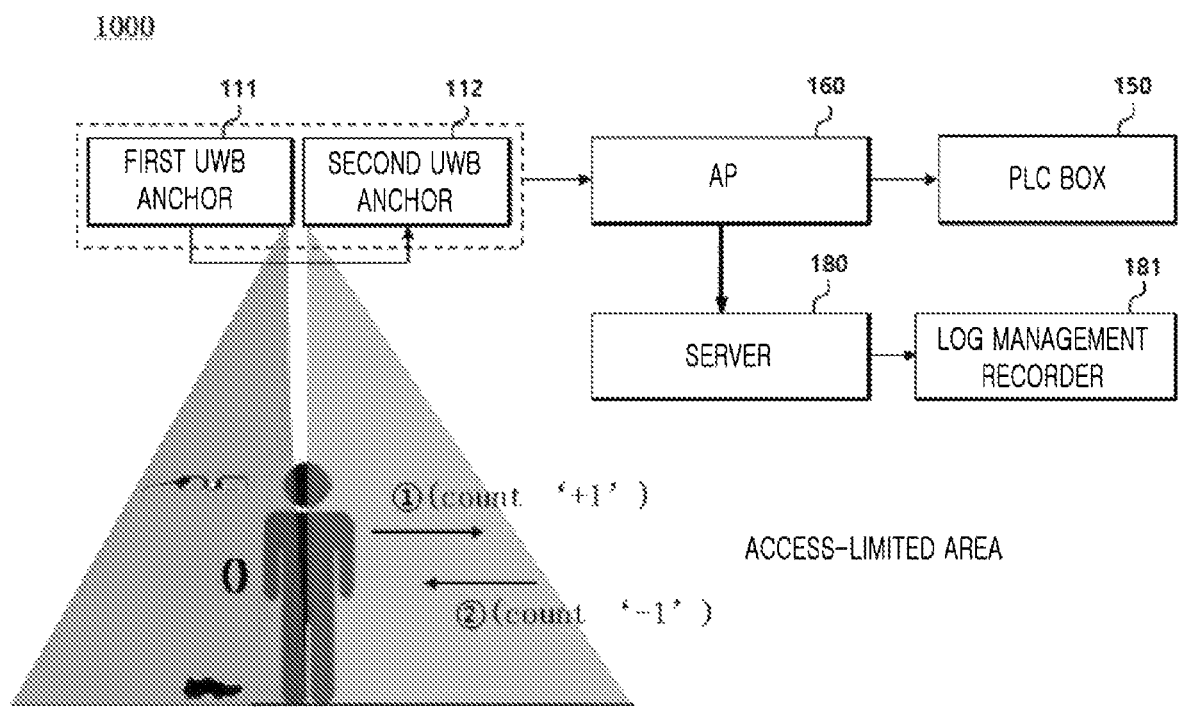
FIG. 14 is a block diagram illustrating an operation of determining an approach to an access-limited area in an accident monitoring system using UWB-based, real-time positioning according to an embodiment.

FIG. 14 is a block diagram illustrating an operation of determining an approach to an access-limited area in an accident monitoring system 1000 using UWB-based, real-time positioning according to an embodiment.

Among a plurality of UWB anchors 110, one positioned relatively far away from a preset access-limited area may be defined as a first UWB anchor 111, and another positioned relatively close to the preset access-limited area may be defined as a second UWB anchor 112. The first and second UWB anchors 111 and 112 may also be defined as access-limited area sensors. Although FIG. 14 illustrates the two UWB anchors as an example, there may be provided more UWB anchors as shown in FIG. 11.

As set forth above, the first and second UWB anchors 111 and 112 may recognize the UWB tag 100 worn on the worker via the AP 160 and transmit the recognized result to the server 180 or PLC box 150. The server 180 may further include a separate log management recorder 181.

The access-limited area sensor may detect an entrance or exit of the worker (or the UWB tag 100) approaching the access-limited area, outputs a first control signal when the worker enters, adds or subtracts the detected entrances and exits, and outputs a second control signal depending on the calculated value.

The first UWB anchor 111 may detect the worker accessing the access-limited area. The first UWB anchor 111 may be operated as a first sensing means of the access-limited area sensor.

Upon detecting the worker's approach via the first UWB anchor 111, the second UWB anchor 112 may be activated by the first UWB anchor 111, sensing the moving directions ① and ② of the worker in a predetermined area. The information sensed by the second UWB anchor 112 may be used as means to determine the operation of the industrial robot 130, conveyor belt, and/or motor 140 in the work site. The second UWB anchor 112 may be in a sleep mode before an object is recognized by the first UWB anchor 111 and may be activated by a sensing signal of the first UWB anchor 111 and be operated.

The second UWB anchor 112 may detect the worker's moving directions as to, e.g., whether the worker approaches (①) the processing line 120 which is the access-limited area or goes away from the processing line 120 (②).

Upon detecting the worker's approach to the processing line 120 which is the access-limited area via the first and second UWB anchors 111 and 112, the count goes up (count '+1') while the first control signal is output to the PLC box 150 or the server 180. Upon receiving the first control signal, the PLC box 150 or the server 180 may temporarily power off, or stop the operation of, the industrial robot 130, conveyor belt, and/or motor 140 operating in the processing line 120.

If the worker is detected as departing from the processing line 120, with the first control signal received, the count may go down (count '−1'). When a total value counted for the moving directions of the worker becomes zero (count '0'), the second control signal may be output to the PLC box 150 or the server 180. Upon receiving the second control signal, the PLC box 150 or the server 180 may resume the operation of the industrial robot 130, conveyor belt, and/or motor 140 which temporarily stopped operation in the processing line 120.

If the total count for the moving directions of the worker is larger than zero, the second control signal may not be output or the first control signal may be maintained as is.

Upon detecting the worker's approach to the processing line 120 which is the access-limited area via the first and second UWB anchors 111 and 112 by the log recorder 181, the server 180 may record the time of approach of the worker and, if the total count becomes zero, records the time of exit of the worker. Further, the server 180 may transmit the log records of the log recorder 181 to the worker's and/or manager's portable mobile device 190.

Upon receiving the first control signal via the AP 160 from the access-limited area sensor, the PLC box 150 may power off, or stop the operation of, the industrial robot 130, conveyor belt, and/or motor 140 and, upon receiving the second control signal, resume the operation of the industrial robot 130, conveyor belt, and/or motor 140 which have powered off or stopped operation. The PLC box 150 may recognize the first control signal as an operation stop signal and the second control signal as an operation start signal or operation resume signal and may control the power or operation of the industrial robot 130, conveyor belt, and/or motor 140.

The server 180 may analyze the log information for the time of entrance and the time of exit recorded by the log recorder 181 and adjust the time of operation of the processing line 120 to make up for the operation stop of the processing line 120.

For example, the server 180 may analyze the log information to calculate the time during which the processing line 120 is not in operation and control to extend the operation time of the processing line 120 to make up for the delayed work as much as the calculated time. Further, the server 180 may grasp, e.g., the state of entrance/exit of the worker to/from the access-limited area by analyzing the recorded log information and process the grasped information to thereby generate data for increasing the productivity and efficiency.

The server 180 may also operate the warning buzzer 152 and warning lamp 153 connected with the PLC box 150, allowing the worker to easily notice information for preparatory control operation of the PLC box 150. For example, if the PLC box 150 receives the first control signal to power off, or stop the operation of, the processing line 120, a specific alert sound instructing to stop the operation may be output and, if the worker exits the access-limited area so that the processing line 120 is resumed by the PLC box 150, a specific alert sound instructing to resume the operation before resuming may be output and, after the alert sound is gone, the processing line 120 may be resumed.

According to an embodiment, the accident monitoring system 1000 using UWB-based, real-time positioning may detect the worker approaching the access-limited area via a new algorithm and control the power or operation of the processing line 120, thereby ensuring the worker's safety and increasing the productivity and efficiency via analysis on the power or operation control signal information for the processing line 120.

Figure 15:
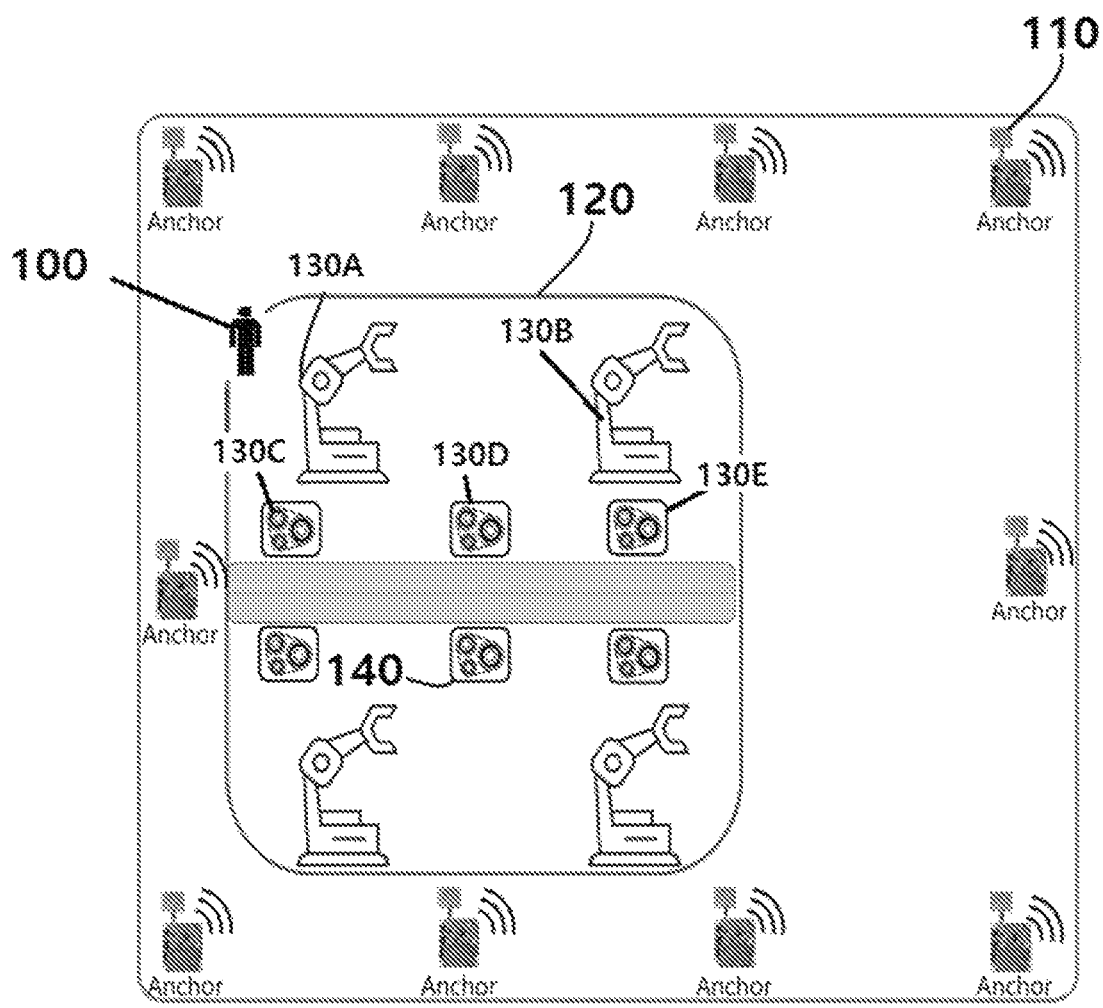
FIG. 15 is a view illustrating a processing line map of an accident monitoring system using UWB-based, real-time positioning according to an embodiment.

FIG. 15 is a view illustrating a processing line map of an accident monitoring system 1000 using UWB-based, real-time positioning according to an embodiment.

Referring to FIG. 15, according to an embodiment, the accident monitoring system 1000 using UWB-based, real-time positioning may also display the worker on the processing line map and may selectively operate, or stop operation of, the industrial robot 130, conveyor belt, and/or motor 140 depending on the worker's position on the processing line map. For example, the server 180 may previously create a map (which may be stored in the memory) based on the coordinates of the industrial robot 130, conveyor belt, and/or motor 140 in the processing line and may display and store the worker's position on the map according to communication between the UWB tag 100 and the UWB anchor 110.

Although the worker has entered the access-limited area in the processing line according to the communication, the server 180 may transmit, to the PLC box 150, a control signal to, rather than simultaneously stopping the operation of the industrial robot 130, conveyor belt, and/or motor 140 in the processing line, stop or slow down only the industrial robot (e.g., 130A in the drawings) which has come close to the worker within a predetermined distance while allowing the other industrial robot, conveyor belt, and/or motor 130C, 130D, 130E, and 140 which are the predetermined distance or more away from the worker to keep on operating.

If the industrial robot 130A is operated in association with the industrial robot 130B, and the conveyor belt and/or motor 130C, 130D, 130E, and 140, and the PLC box 150 slows down the industrial robot 130A, the associated industrial robot 130B and conveyor belt and/or motor 130C, 130D, 130E, and 140 may also slow down, thus preventing any problem with production in the work site.

If the worker gets the predetermined distance or more away from the industrial robot 130A, and the other industrial robot 130B approaches within the predetermined distance, the server 180 may transmit, to the PLC box 150, a control signal to resume the operation of the industrial robot 130A while stopping or slowing down the industrial robot 130 B.

The server 180 may also calculate the time of approach of the worker to the industrial robot based on the current position of the worker who has entered the access-limited area in the processing line 120 and the current position of the industrial robot, conveyor belt, and/or motor on the processing line map and, if the calculated approach time is a preset reference value or more (or less than the preset reference value), output a control signal to keep on operating the industrial robot to the PLC box 150 and, if the calculated approach time is within the preset reference value (or not less than the reference value), output a control signal to stop the industrial robot to the PLC box 150. As an example, if the industrial robot, conveyor belt, and/or motor operates cooperatively with the worker, the server 180 may enable the PLC box 150 to adjust the operation speed of the industrial robot, conveyor belt, and/or motor depending on the time of approach of the worker, thereby enhancing the worker's safety and productivity.

The server 180 may output, to the PLC box 150, a control signal to maintain the operation of the industrial robot while maintaining a predetermined distance from the worker, considering the moving route (or the worker's pre-entered work name/work position in the area) of the worker who has entered the access-limited area in the processing line.

According to an embodiment of the disclosure, when the worker approaches the access-limited area in the processing line 120, the accident monitoring system 1000 using UWB-based, real-time positioning may, rather than stopping all the industrial robots, conveyor belt, and/or motor in the processing line, stop or slow down only the robot which is positioned within a reference distance from the worker, stop or slow down only the robot for which the time of approach of the worker is within a reference time (or not less than the reference time), or refrain from stopping the robot in a predetermined work name/work position. As such, the system 1000 enables the operation of various robots in the processing line in a flexible manner, thereby preventing a lowering in the productivity of the processing line when the worker accesses the access-limited area in the processing line.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. An accident monitoring system based on ultra-wide band (UWB)-based real-time positioning, comprising:
   a UWB tag worn on a worker;
   a plurality of UWB anchors installed around a processing line where an industrial robot, a conveyor belt, and a motor are installed, the plurality of UWB anchors receiving the worker's position from the UWB tag and sensing a temperature, humidity, illuminance, and frequency of the processing line;
   an access point (AP) receiving the worker's position and the temperature, humidity, illuminance, and frequency of the processing line from the plurality of UWB anchors;
   a server receiving the worker's position and the temperature, humidity, illuminance, and frequency of the processing line from the AP, storing the worker's position and the temperature, humidity, illuminance, and frequency of the processing line, and determining whether the worker is in a preset access-limited area; and
   a programmable logic control (PLC) box, upon receiving proximity information indicating that the worker is the access-limited area from the server through the AP, controlling to stop the industrial robot, the conveyor belt, and the motor in the processing line.

2. The accident monitoring system of claim 1, wherein the plurality of UWB anchors are attached or fastened in positions where the overall processing line is scannable.

3. The accident monitoring system of claim 2, wherein the plurality of UWB anchors are wirelessly time-synchronized with each other.

4. The accident monitoring system of claim 2, wherein the UWB tag transmits a time stamp to each of the plurality of UWB anchors, wherein each of the plurality of UWB anchors transmits the time stamp through the AP to the server, and wherein the server determines a position of the UWB tag based on a difference between the time stamps received from the plurality of UWB anchors.

5. The accident monitoring system of claim 1, wherein a warning buzzer and a warning lamp are connected to the PLC box, the warning buzzer and the warning lamp outputting a warning signal to the worker when receiving the proximity information from the server through the AP.

6. The accident monitoring system of claim 1, wherein upon receiving the proximity information, the server transmits a warning signal to the worker's portable mobile device.

7. The accident monitoring system of claim 1, wherein the server transmits information for the worker's position and the temperature, humidity, illuminance, and frequency of the processing line to the worker's portable mobile device.

8. The accident monitoring system of claim 1, wherein a locking device is connected with the PLC box to allow the worker to enter or exit the processing line, and wherein when the locking device is released, the locking device transmits a release signal to the PLC box to set the PLC box to a normal entrance/exit mode.

9. The accident monitoring system of claim 8, wherein upon receiving the proximity information from the server through the AP while in the normal entrance/exit mode, the PLC box controls to stop the industrial robot, the conveyor belt, and the motor in the processing line.

10. The accident monitoring system of claim 8, wherein upon receiving the proximity information from the server through the AP while the locking device is not released, the PLC box is set to an abnormal entrance/exit mode.

11. The accident monitoring system of claim 10, wherein a warning buzzer and a warning lamp are connected with the PLC box, and wherein the warning buzzer and the warning lamp are operated in the abnormal entrance/exit mode.

12. The accident monitoring system of claim 1, wherein the server extracts a recall and precision value from the received temperature, humidity, illuminance, and frequency information for the processing line based on classification among machine learning algorithms to thereby accumulate effective data, compares the effective data with a pre-entered maintenance period for the processing line, and if the effective data meets the maintenance period for the processing line, transmits a maintenance period information warning signal for the processing line to a manager's portable mobile device.

13. The accident monitoring system of claim 1, wherein the server compares the received temperature, humidity, illuminance, and frequency information for the processing line with pre-entered normal temperature, humidity, illuminance, and frequency information for the processing line, and if the received temperature, humidity, illuminance, and frequency information for the processing line departs from the normal temperature, humidity, illuminance, and frequency, transmits a temperature, humidity, illuminance, and frequency information warning signal to a manager's portable mobile device.

* * * * *